INVENTOR.
JOHN W. GRAY
BY
ATTORNEY

Aug. 18, 1959  J. W. GRAY  2,900,599
FREQUENCY MARKING CIRCUIT
Filed Sept. 8, 1954  2 Sheets-Sheet 2
Fig. 2
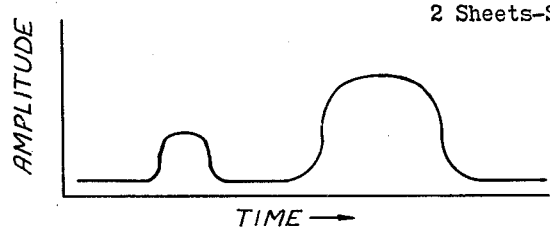
Fig. 3
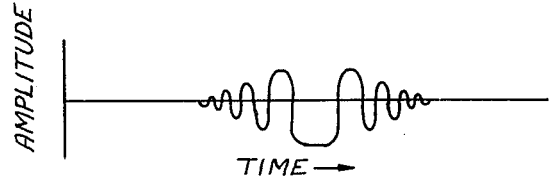
Fig. 4
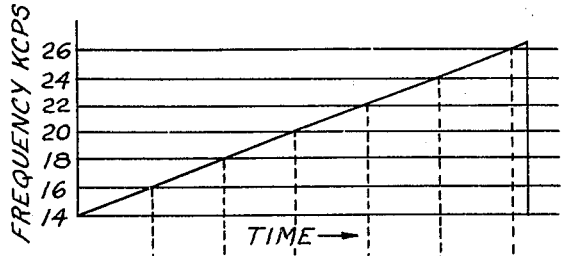
Fig. 5
Fig. 6
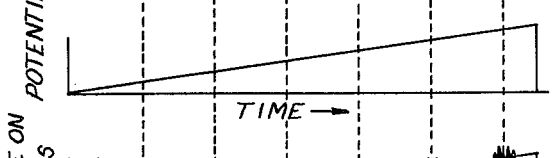
Fig. 7
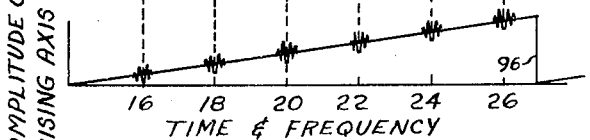
INVENTOR.
JOHN W. GRAY
BY
ATTORNEY United States Patent Office 2,900,599
Patented Aug. 18, 1959

2,900,599

FREQUENCY MARKING CIRCUIT

John W. Gray, Pleasantville, N.Y., assignor to General Precision Laboratory Incorporated, a corporation of New York Application September 8, 1954, Serial No. 454,743

8 Claims. (Cl. 324—78)

This invention relates to circuits for the electronic generation of frequency markers at selected frequency intervals.

One purpose of this invention is to provide apparatus for producing an output signal whose frequency progressively changes relative to a time scale and which produces marking pulses at selected regular frequency intervals.

Another purpose of this invention is to provide a circuit generating a potential having a slowly changing frequency and another circuit for generating an alternating potential of constant and accurately known frequency, together with a coincidence mixer for deriving from these potentials discrete frequency marking pulses at regular frequency intervals.

Still another purpose of this invention is to provide a coincidence mixer generating from appropriate input signals an output signal progressing in frequency with time and having increased amplitude at regular selected frequency intervals.

Electrical frequency spectrum analyzers generally sweep the spectrum to be analyzed with a slow sweep measured in seconds or minutes, and indicate or record the composition of the spectrum by variations of amplitude on a rectangular coordinate graph having frequency for the other coordinate. One way of securing a scale to apply to the frequency coordinate axis is to generate it electronically, and apparatus for performing this function forms the subject of this specification. The apparatus may also be used independently or with other apparatus.

The apparatus of this invention consists generally of a coincidence mixer circuit with two input circuits and an output circuit therefor. One input circuit consists of an alternating square wave generator having approximately linearly changing frequency. For example, the frequency may increase through one octave over a time of one minute, then revert to its low value and repeat the process. The other input circuit generates narrow pulses which occur with extreme regularity at a selected lower standard frequency. The output circuit of the coincidence mixer is so devised that there is no alternating or pulse output signal except when the changing frequency input is at or very near an integral multiple of the standard frequency pulse input. The output thus consists of a series of discrete output bursts, of alternating or pulse nature, separated by time and also separated by the amount of the standard frequency. In order to distinguish the beginning of each sweep cycle a sweep cycle sawtooth voltage is combined with the output.

When the coincidence marker circuit is employed as a scalemarking adjunct of a spectrum analyzer the variable frequency square wave potential which is generated to serve as one input of the coincidence marker is also employed in the spectrum analyzer, so that the time scale employed in the analyzer is identical with that employed in the coincidence marker. This is accomplished by displaying both the spectrum analysis output data and the coincidence marker scale on the same display and with a single time base.

Further understanding of this invention may be secured from the detailed description and associated drawings in which:

Figure 2 is a graph illustrating the process of frequency spectrum analysis.

Figure 1:
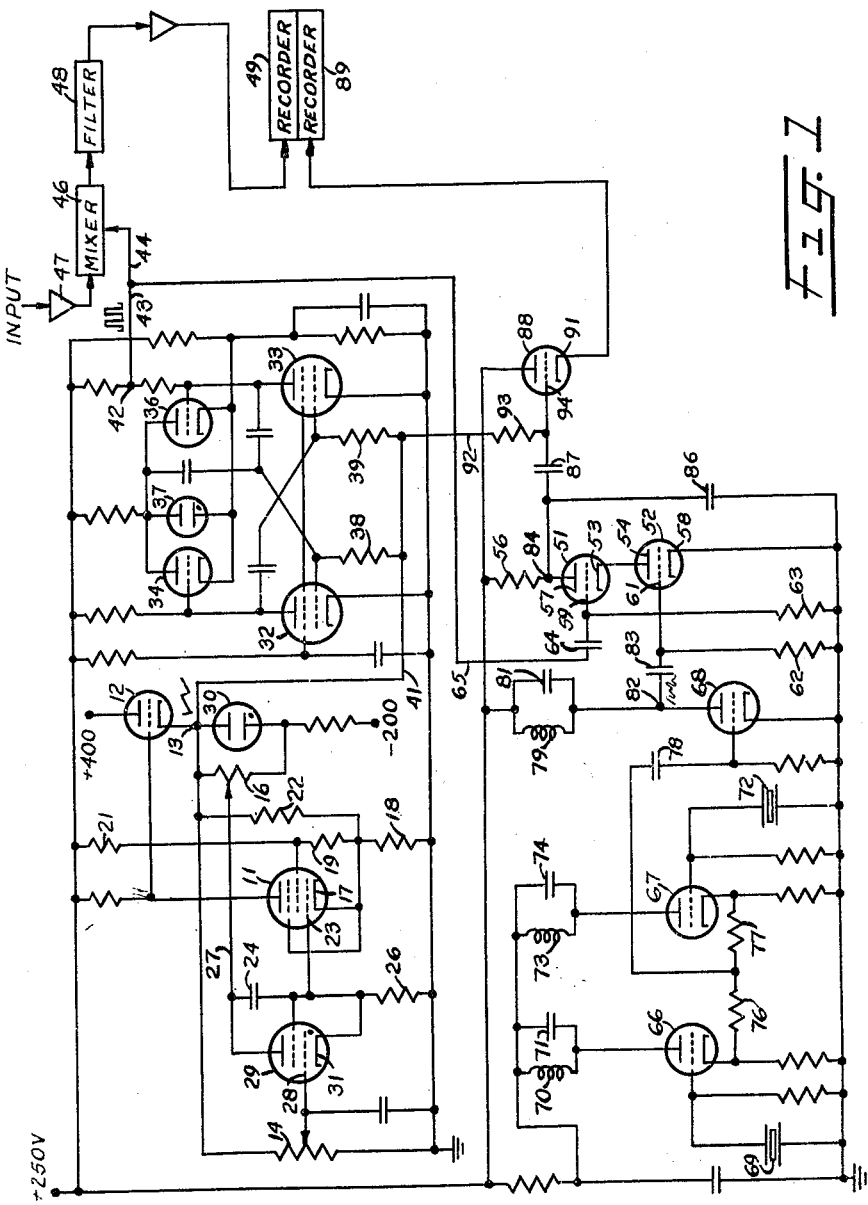
Figure 1 depicts a circuit representative of the coincidence marker of this invention.

Figures 3, 4, 5, 6, and 7 are graphs illustrating the operation of the coincidence marker of the invention.

Referring now to Fig. 1, a slow-sweep sawtooth generator includes pentode 11 and cathode follower 12, providing a sawtooth voltage waveform at output terminal 13 which has an abrupt downgoing branch and a slow, approximately linear, rising branch. The excursion may be, for example, 60 volts and the period one minute. Both the top and bottom voltages of the sawtooth excursion are independently adjustable by voltage dividers 14 and 16 respectively, neither adjustment affecting the sweep rate. The cathode 17 of pentode 11 is connected to a voltage divider consisting of resistors 18, 19 and 21 so that the cathode voltage is fixed at 50 volts above ground. The amplification of pentode 11 is increased by positive feedback through resistor 22 to such an extent that the change in voltage of control grid 23 during the sawtooth excursion is negligible.

The operation of this generator depends on the use of a Miller negative feedback condenser 24, the size of which together with the size of resistor 26 principally determines the sweep rate. Let it be supposed that the output potential is rising. This increases the potential applied through conductor 27 to condenser 24 at a rate which exactly balances the reduction in voltage which would be occasioned by discharge through resistor 26. Thus the current in resistor 26 is held constant and the voltage of grid 23 is held constant. As the output potential rises it increases the potential applied through voltage divider 14 to the control grid 28 of a thyratron 29, the cathode 31 of which is held at about 50 volts, until the thyratron fires, the firing voltage being controlled by the setting of voltage divider 14. When the thyratron 29 conducts it abruptly discharges the Miller condenser 24 to a value of about 8 volts, and the potential of output terminal 13 concomitantly drops to a point determined by the setting of voltage divider 16 connected in shunt with a voltage regulator tube 30. The output potential then again commences to rise slowly, thus producing a sawtooth waveform.

A rectangular waveform oscillator is employed which can be approximately linearly controlled in output frequency over wide limits. This oscillator includes tetrodes 32 and 33 connected as a free-running multivibrator. Triodes 34 and 36 are "plate catchers," and a neon tube 37 acts as a relaxation oscillator, when the multivibrator is not oscillating, to insure starting of the multivibrator. The frequency of the multivibrator output is controlled by direct-current grid bias applied through grid resistors 38 and 39 and through conductor 41 from the slow sweep generator output terminal 13. The bias voltage versus output frequency characteristic is relatively linear. Output is taken from plate resistor terminal 42. This circuit is described and claimed in Patent No. 2,653,242 issued September 22, 1953.

One function of the two circuit components so far described may be to assist in analyzing a frequency spectrum. To perform this function the output terminal 42 is connected through conductors 43 and 44 to a mixer 46 to which also the unknown spectrum is applied through an amplifier 47. The sum or difference frequency resulting from multiplication in the mixer is passed through a sharp band-pass filter 48 which is tuned to a narrow frequency band above or below the range of frequencies emitted by the multivibrator. Therefore, during the time of one multivibrator sweep period currents having one or more bands of frequency corresponding to the input spectrum in form are passed by filter 48. These may be amplified and registered on a pen recorder 49 as a time-amplitude curve, a representative curve being shown in Fig. 2. Obviously, insofar as the time rate of movement of the paper recording the curve corresponds linearly with the frequency change of the multivibrator characteristic, the time scale of Fig. 2 may be shown as a frequency scale.

The accuracy of such a frequency scale is good enough for many purposes, but for highest accuracy the scale must be derived directly from the multivibrator output frequency. Even if the linearity of the multivibrator output frequency, be perfect at any time, the characteristic will drift to some extent, so that in such cases also a frequency scale directly derived from the multivibrator output is required.

The means of deriving such a frequency scale constitutes the subject of this invention.

In order to accomplish this purpose, a cascode coincidence mixing circuit is provided including triodes 51 and 52, with the cathode 53 of triode 51 connected directly to anode 54 of triode 52. Positive potential is connected through resistor 56 to anode 57, and cathode 58 is grounded. The two inputs to be mixed or multiplied are connected to the grids 59 and 61, and output is taken from anode 57. A resistor 62 having a very high resistance connects grid 61 to ground while resistor 63 connects grid 59 to ground. Grid 59 is coupled through condenser 64 and conductors 65 and 43 to the multivibrator output terminal 42.

A standard source of constant frequency potential required for application to grid 61 comprises triodes 66, 67 and 68, constituting a crystal-controlled beat-frequency oscillator. Triode 66, together with a quartz crystal 69 and a tuned shunt circuit composed of inductance 70 and capacitance 71 in the anode circuit, constitutes a crystal oscillator of high constancy. For production of a 2 kc.p.s. frequency output potential the frequency of this oscillator may be 80 kc.p.s. Another similar oscillator tuned to 82 kc.p.s. comprises triode 67, crystal 72, inductance 73 and capacitance 74. The outputs are added in resistors 76 and 77 and are coupled through capacitor 78 to a triode mixer 68 which generates the 2 kc.p.s. beat difference frequency. This tube is provided with a shunt circuit in its anode conductor composed of inductance 79 and capacitance 81 resonant at 4 kc.p.s. Capacitor 81 largely shunts out the 80 and 82 kc.p.s. frequencies, and the resonant circuit generates the 4 kc.p.s. second harmonic of the 2 kc.p.s. energy applied to it, so that both 2 and 4 kc.p.s. appear at the output conductor. The 2 kc.p.s. potential has the greater amplitude and the presence of the second harmonic narrows the 2 kc.p.s. peaks.

The standard frequency output of the crystal beat-frequency oscillator is taken from plate terminal 82 and is coupled through condenser 83 to the cascode grid 61. This grid draws current during positive portions of the input signal so that grid detection takes place, and the input signal becomes biased with the positive 2 kc.p.s. peaks having amplitudes above cutoff but with the alternate or 4 kc.p.s. lower positive peaks having amplitudes below cutoff. Grid 61 is therefore made positive and triode 52 conductive for 5% or less of the total time and at a 2 kc.p.s. rate.

In the operation of the cascode coincidence mixer, plate current cannot flow except when both triode grids are coincidentally positive relative to their operating axes. When this occurs, grid 59 does not draw current because cathode 53, by cathode follower action, sets its voltage above the grid. Let it be assumed that the square wave frequency signal applied to grid 59 has a range from 14 to 28 kc.p.s., and that the frequency of this signal is slowly rising. When the signal frequency is an exact multiple of 2 kc.p.s., in phase therewith, and positive, repeated short pulses of current will occur through the cascode triodes, corresponding negative pulse potentials being produced at the output terminal 84. A low-pass filter having an integrating effect is formed by anode resistor 56 and condenser 86, with the result that an integrated negative change of potential is applied to coupling condenser 87 at exact synchronism. As the frequency of the potential applied to grid 59 slowly rises, the output phase changes, producing a beat frequency signal which is applied to condenser 87. The time constant of the low-pass filter corresponds to 50 c.p.s. so that, as the beat frequency increases, the signal potential is rapidly attenuated. The output then has the form shown in Fig. 3, in which the beat frequency of the signal increases from zero at the center toward both right and left, while the amplitude rapidly diminishes. This output signal is applied to a cathode follower 88, Fig. 1, to avoid loading the mixer and to match the impedance of a recorder 89 connected to the cathode follower cathode 91. The recorder 89 may be a second pen of an ink recorder having a first pen 49.

The output time-frequency characteristic of the multivibrator comprising tubes 32 and 33 is shown in Fig. 4. The particular multivibrator shown for illustration and described above is very linear so that the characteristic of Fig. 4 is drawn as a perfectly straight line. However, its linearity cannot actually be perfect, and drift with time is always present. It should be pointed out that between frequency check points the linearity of the multivibrator characteristic is relied on for frequency scale interpolation, and it is also noted that the time-frequency linearity requirement for the multivibrator is reduced by the use of standard frequency check points to merely that linearity required for interpolation.

In Fig. 4, the frequency rises with time to a maximum, then abruptly drops to its minimum value. The time and frequency scales of Fig. 4 are both linear. As the square wave multivibrator output is applied to grid 59 of the cascode mixer, output bursts of alternating current appear only at integral multiples of 2 kc.p.s., as explained, and within about 50 c.p.s. of each such point. These bursts therefore occur in time only where the curve of Fig. 4 crosses the ordinate values which are multiples of 2 kc.p.s., resulting in the bursts shown on a linear time scale in Fig. 5. Since these bursts mark exact 2 kc.p.s. intervals on the horizontal scale, an irregulator frequency scale can be marked thereon and is in fact constituted by the bursts themselves.

In order to mark the beginning and end of each sawtooth cycle on recorder 89, Fig. 1, the output sawtooth potential of the slow sweep generator is led from conductor 41 through conductor 92 and decoupling resistor 93 to the grid 94 of cathode follower 88. This sawtooth potential is easily made linear to about one percent and therefore will appear perfectly linear when depicted on a small scale graph. This potential is shown in Fig. 6. The output bursts from the cascode mixer are superimposed in cathode follower 88, Fig. 1, on the rising sawtooth potential of Fig. 6, with the output potential at cathode 91 shown in Fig. 7, flyback being indicated by the vertical line 96.

It has been implied that other circuits than those described may be employed as full equivalents of the slow sweep generator circuit, square wave generator circuit, and the standard frequency circuit. This is true and there are in fact numerous other circuits, some having special advantages, which may be substituted for these three types of circuit as described. Additionally, a restricted number of mixer circuits may be substituted as the equivalent in some respects of the described coincidence mixer circuit.

What is claimed is:

1. A frequency indicating circuit comprising, means for generating a signal whose frequency is periodically varied over a selected range of frequencies, means for generating a standard frequency signal having positive peaks occurring at a periodic rate below that of said selected range of frequencies, coincidence mixer means having said variable frequency signal and said standard frequency signal imposed thereon and conductive only during coincidence of the positive peaks of said standard signal and the positive portions of said variable frequency signal, and low-pass filter means connected to the output of said coincidence mixer means.

2. A frequency indicating circuit comprising, means for generating a signal whose frequency is periodically varied over a selected range of frequencies, means for generating a standard frequency signal whose frequency is lower than said range of frequencies, means for producing the second harmonic of said standard frequency signal, means for combining said second harmonic with said standard frequency signal to produce a signal waveform having accentuated positive peaks at the fundamental frequency of said standard signal, coincidence mixer means having said variable frequency signal and said signal waveform impressed thereon and rendered conductive only during coincidence of the positive peaks of the fundamental of said standard frequency signal and the positive portions of said variable frequency signal, and low-pass filter means connected to the output of said coincidence mixer means.

3. A frequency indicating circuit comprising, means for generating a square wave signal whose frequency is periodically varied over a selected range of frequencies, means for generating a standard frequency signal having positive peaks occurring at a periodic rate below that of said selected range of frequencies, coincidence mixer means having said square wave signal and said standard frequency signal imposed thereon and rendered conductive only during coincidence of the positive peaks of said standard frequency signal and the positive portions of said square wave signal, and low-pass filter means connected to the output of said coincidence mixer means.

4. A frequency indicating circuit comprising, means for generating a square wave signal whose frequency is periodically varied over a selected range of frequencies, means for generating a standard frequency signal whose frequency is lower than said range of frequencies, means for producing the second harmonic from said standard frequency signal, means for combining said standard frequency signal and said second harmonic to produce a signal waveform having accentuated sharpened peaks at the fundamental standard frequency, coincidence mixer means having said square wave signal and said signal waveform impressed on the input thereof, said coincidence mixer means being rendered conductive only during the intervals of coincidence of positive fundamental peaks of said signal waveform and positive portions of said square wave signal, and low-pass filter means connected to the output of said coincidence mixer means.

5. A frequency indicating circuit comprising, means for generating a signal whose frequency is periodically varied over a selected range of frequencies, means for generating a waveform signal having positive peak impulses occurring at a periodic rate less than that of said selected range of frequencies, a first triode, a second triode having its anode directly connected to the cathode of said first triode, an output circuit connected to the anode of said first triode, said output including a low-pass filter circuit, means for impressing said variable frequency signal between the control grid of said first triode and the cathode of said second triode, and means for impressing said waveform signal on the control grid of said second triode.

6. A frequency indicating circuit comprising, means for generating a signal whose frequency is periodically varied over a selected range of frequencies, means for generating a standard frequency signal having a frequency which is lower than said range of frequencies, means for producing the second harmonic from said standard frequency signal, means for combining said standard frequency signal and said second harmonic to produce a signal waveform having accentuated sharpened peaks at the fundamental standard frequency, a first triode, a second triode having its anode directly connected to the cathode of said first triode, a resistor connected between the control grid and cathode of said second triode, a second resistor connected between the control grid of said first triode and the cathode of said second triode, means for impressing said variable frequency signal on the control grid of said first triode, means for impressing said signal waveform on the control grid of said second triode, and an output circuit including a low-pass filter connected to the anode of said first triode.

7. A frequency indicating circuit comprising, a square wave generator, a sawtooth generator, means for varying the frequency of the signal generated by said square wave generator in accordance with the output of said sawtooth generator, means for generating a signal waveform having positive peak impulses occurring at a lower frequency than the frequency of the signal generated by said square wave generator, a coincidence mixer including a pair of tubes connected in cascode, means for impressing the output of said square wave generator on the control grid of one of said tubes, means for impressing said signal waveform on the control grid of the other of said tubes, display means, a low-pass filter connected between the output of said coincidence mixer and said display means, and means for superimposing the output of said sawtooth generator on the output of said low-pass filter.

8. A coincidence marker for electronically generating marks at regular intervals on a frequency scale comprising, electronic tube coincidence mixer means having a pair of control electrodes and an output electrode emitting a potential change representing the instantaneous product of positive potentials applied to said pair of control electrodes, a pulse generator having a constant period constituting a frequency standard connected to one said control electrode, a square wave generator variable over a range of frequencies higher than the periodicity of said pulse generator, said square wave generator being connected to the other said control electrode, a slow sweep sawtooth generator, means connecting the output of said slow sweep sawtooth generator to control the output frequency of said square wave generator, whereby said output frequency varies through its range of frequencies slowly in one sense and returns rapidly, voltage recording display means connected to said output electrode, low-pass filter means connected to said voltage recording display means permitting operation thereof at frequencies at and near zero frequency and less than 100 cycles per second, and circuit means applying the potential output of said slow sweep sawtooth generator to said voltage recording display means to superimpose a sawtooth form on the recording thereof.

References Cited in the file of this patent

UNITED STATES PATENTS

| | | |
|---|---|---|
| 2,250,708 | Herz | July 29, 1941 |
| 2,574,494 | Palmer | Nov. 13, 1951 |
| 2,586,605 | Blumlein et al. | Feb. 19, 1952 |
| 2,588,730 | Johnson | Mar. 11, 1952 |
| 2,593,281 | El-Said | Apr. 15, 1952 |
| 2,602,140 | Fink | July 1, 1952 |
| 2,610,228 | Devine | Sept. 9, 1952 |
| 2,626,980 | Balde | Jan. 27, 1953 |
| 2,640,105 | Bennett | May 26, 1953 |
| 2,761,019 | Hall | Aug. 28, 1956 |
| 2,766,450 | Frank | Oct. 9, 1956 |